(12) United States Patent
Ekanayake et al.

(10) Patent No.: US 8,475,862 B2
(45) Date of Patent: *Jul. 2, 2013

(54) ISOTHIOCYANATE PRESERVATIVES AND METHODS OF THEIR USE

(75) Inventors: Athula Ekanayake, Cincinnati, OH (US); Jeffrey John Kester, West Chester, OH (US); Jianjun Justin Li, West Chester, OH (US); Gerhard Norbert Zehenbauer, Lawrence, KS (US); Paul Ralph Bunke, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 87 days.

This patent is subject to a terminal disclaimer.

(21) Appl. No.: 13/249,398

(22) Filed: Sep. 30, 2011

(65) Prior Publication Data

US 2012/0052176 A1    Mar. 1, 2012

Related U.S. Application Data

(63) Continuation-in-part of application No. 12/642,894, filed on Dec. 21, 2009, now Pat. No. 8,084,072, which is a continuation of application No. 10/914,389, filed on Aug. 9, 2004, now Pat. No. 7,658,961.

(60) Provisional application No. 60/507,853, filed on Oct. 1, 2003.

(51) Int. Cl.
*A23L 3/34* (2006.01)

(52) U.S. Cl.
USPC .............................. 426/532; 426/541; 426/547

(58) Field of Classification Search
USPC ................. 426/531, 532, 534, 535, 541, 544, 426/547
See application file for complete search history.

(56) References Cited

U.S. PATENT DOCUMENTS

| | | |
|---|---|---|
| 3,998,964 A | 12/1976 | Madaus et al. |
| 5,334,373 A | 8/1994 | Sekiyama et al. |
| 5,703,124 A | 12/1997 | Takata et al. |
| 6,361,812 B1 | 3/2002 | Ekayanake et al. |
| 7,658,961 B2 | 2/2010 | Ekayanake et al. |
| 2003/0064131 A1 | 4/2003 | Murata et al. |
| 2003/0152676 A1 | 8/2003 | Yajima et al. |
| 2003/0235634 A1 | 12/2003 | Pusateri et al. |
| 2005/0031768 A1 | 2/2005 | Sakai et al. |
| 2006/0127996 A1 | 6/2006 | Fahey et al. |
| 2010/0098822 A1 | 4/2010 | Ekanayake et al. |

FOREIGN PATENT DOCUMENTS

| | | |
|---|---|---|
| EP | 0 557 946 A1 | 2/1993 |
| EP | 1 252 827 A1 | 10/2001 |
| FR | 2556934 | 6/1985 |
| JP | 04207179 | 7/1992 |
| JP | 04-304840 | 10/1992 |
| JP | 11262381 | 9/1999 |
| WO | WO 98/33391 A1 | 8/1998 |

*Primary Examiner* — Leslie Wong
(74) *Attorney, Agent, or Firm* — Kim William Zerby

(57) ABSTRACT

A composition for preserving solid food products comprising a moisture-sensitive isothiocyanate compound and a hygroscopic carrier, wherein the composition is substantially free of sorbic acid, benzoic acid, and salts thereof. Also disclosed is a solid food product containing the aforementioned preservative composition and a method for preserving solid food products including the steps of adding a moisture-sensitive isothiocyanate to the solid food product and storing the resulting product at a reduced temperature.

10 Claims, No Drawings

ISOTHIOCYANATE PRESERVATIVES AND METHODS OF THEIR USE

CROSS REFERENCE TO RELATED APPLICATION

This application claims priority to and is a continuation-in-part application of U.S. application Ser. No. 12/642,894, filed Dec. 21, 2009 now U.S. Pat. No. 8,084,072, which is a continuation application of U.S. application Ser. No. 10/914,389, filed Aug. 9, 2004 now U.S. Pat. No. 7,658,961, which is now U.S. Pat. No. 7,658,961, which claimed the benefit of priority to U.S. Provisional Application No. 60/507,853, filed Oct. 1, 2003, all of which are incorporated by referenced herein in their entireties.

FIELD OF THE INVENTION

The present invention relates to compositions comprising moisture-sensitive isothiocyanate preservatives that are particularly useful in preserving food products. The invention also relates to the food products treated with those preservative compositions, as well as methods of preserving products comprising utilizing the foregoing isothiocyanate preservatives.

BACKGROUND OF THE INVENTION

Consumer products can provide a hospitable environment for rapid microbial growth. Such exposure can, and frequently does, result from inadvertent microbial inoculation of the product during manufacturing or packaging. Spoilage microorganisms, for example in food products, can then rapidly proliferate by feeding on nutrients provided by the product.

Preservatives, such as sorbates, benzoates, organic acids, and combinations thereof have been used in various products, particularly foods and beverages, to provide some degree of microbial inhibition. However at levels effective to inhibit microbial growth, some of these preservatives can contribute off-flavors in the product, thus making the product undesirable for its intended purpose. Similarly, natural preservatives, such as natamycin, are frequently used in food and beverage products to inhibit microbial growth. Unfortunately, while these natural preservatives may be effective against either yeast or bacteria, they may not be effective against both.

It has been disclosed that the essential oil of mustard plants, which contain isothiocyanates, exhibits an antibacterial and antimycotic effect in oral therapies and on certain foods. See e.g., Sekiyama et al., U.S. Pat. No. 5,334,373, assigned to Nippon Sanso Corp., issued Aug. 2, 1994; and Madaus et al., U.S. Pat. No. 3,998,964, issued Dec. 21, 1976. The isothiocyanate compounds in mustard essential oils are the active agents that provide the antimicrobial effect. The essential oil derived from white or yellow mustard plants (*Sinapis alba* or *Brassica alba*), also provides the foregoing antibacterial and antimycotic benefits, however, it is known in the art that white mustard essential oil is a viscous oil that is, therefore, difficult to evenly disperse within solid food products or on solid food product surfaces. Furthermore, isothiocyanate compounds are effective antimicrobial agents at relatively low usage levels. Therefore, it can be difficult to uniformly distribute such low levels within a solid food matrix or on the surface of a solid food product. Moreover, the principal isothiocyanate present in the white mustard essential oil, 4-hydroxybenzyl isothiocyanate, is a moisture-sensitive compound that begins to degrade (i.e. hydrolyze) within hours of being exposed to moisture. When degraded, the 4-hydroxybenzyl isothiocyanate forms, among other compounds, 4-hydroxybenzyl alcohol.

Currently, the mustard processing industry makes use of the white mustard flour primarily, while the essential oil is largely ignored. In fact, to make use of the white mustard flour without the 'heating' sensation of mustard, the ground mustard flour is subjected to a thermal deactivation step. Here the enzyme myrosinase, which catalyzes the formation of 4-hydroxybenzyl isothiocyanate from its precursor 4-hydroxybenzylglucosinolate, is intentionally deactivated so that the essential oil does not form when the flour is mixed with moist food products such as meat and sausage. Additionally, because of its instability, 4-hydroxybenzyl isothiocyanate is not currently available commercially, whether as a natural product or as a pure chemical.

Accordingly, for all of the above reasons, white mustard essential oil has not been widely known or widely utilized in the art for its antibacterial and antimycotic effect. This is particularly true for solid food products, for which uniform dispersion of the white mustard essential oil may be difficult and for which prolonged periods of storage may be required, hence, prolonged periods of exposure to moisture.

However, the present inventors have surprisingly discovered that by generating the white mustard essential oil by adding water to ground mustard, extracting the white mustard essential oil using solvents or supercritical fluids, rapidly drying the essential oil by removing residual moisture, and then intimately blending the resulting white mustard essential oil with a hygroscopic carrier, the moisture-sensitive isothiocyanate compounds contained therein are stabilized. Hence, the blend of white mustard essential oil with a hygroscopic carrier is, thereafter, capable of being used as an effective antibacterial and antimycotic agent for solid food products.

SUMMARY OF THE INVENTION

The present invention relates to a composition for preserving solid food products, comprising:
  a. a moisture-sensitive isothiocyanate compound; and
  b. a hygroscopic carrier;
  wherein the composition is substantially free of sorbic acid, benzoic acid, and salts thereof.

Additionally, the present invention relates to a solid food product having added thereto a preservative composition comprising a moisture-sensitive isothiocyanate compound, wherein the preservative composition is substantially free of sorbic acid, benzoic acid and salts thereof.

Finally, the present invention relates to a method for preserving a solid food product, the method comprising:
  a) providing a solid food product;
  b) adding to the solid food product a preservative composition comprising a moisture-sensitive isothiocyanate compound; and
  c) within about 2 hours after adding the preservative composition to the solid food product, maintaining the temperature of the solid food product at a temperature not more than about 10° C. for at least about 12 hours.

DETAILED DESCRIPTION OF THE INVENTION

Publications and patents are referred to throughout this disclosure. All references cited herein are hereby incorporated by reference.

All percentages, ratios, and proportions used herein are by weight unless otherwise specified.

In the description of the invention various embodiments and/or individual features are disclosed. As will be apparent to the ordinarily skilled practitioner all combinations of such embodiments and features are possible and can result in preferred executions of the invention.

The products herein may comprise, consist essentially of, or consist of any of the elements as described herein.

I. DEFINITION AND USAGE OF TERMS

The following is a list of definitions for terms used herein:

As used herein, the term "antimicrobial effect" means that the product inhibits growth of, eliminates, and/or otherwise decreases the presence of microorganisms such as, for example, yeast, bacteria, mold, and/or fungus, preferably yeast and/or bacteria.

As used herein, "essential oil" refers to the set of all the compounds that can be distilled or extracted from the plant from which the oil is derived and that contributes to the characteristic aroma of that plant. See e.g., H. McGee, *On Food and Cooking*, Charles Scribner's Sons, p. 154-157 (1984). In accordance with the present invention, the essential oil preferably originates from the white or yellow mustard plant (*Sinapis alba* or *Brassica alba*), which is capable of producing a moisture-sensitive isothiocyanate compound, and more specifically, 4-hydroxybenzyl isothiocyanate.

As used herein, the term "hygroscopic carrier" means a substance that is capable of attracting, absorbing, and binding moisture. Such substance may be in liquid, powdered or granular solid form.

As used herein, the term "moisture-sensitive" means that the isothiocyanate compound degrades in the presence of water. This degradation proceeds via a hydrolysis reaction, thereby leading to a reduction in level of the active isothiocyanate antimicrobial agent with time of storage in the presence of water. The method for determining moisture sensitivity is set forth in the Test Method section below. Moisture-sensitive isothiocyanates are characterized by a reduction in concentration of the isothiocyanate compound of at least about 20% of the starting concentration, when suspended in an aqueous phosphate buffer having a pH of about 3.6, and a temperature of from about 20° C. to about 23° C., over a 24 hour period.

As used herein, the term "natural component," with reference to the corresponding essential oil, refers to a component utilized in the present invention that is obtained from the naturally occurring essential oil.

As used herein, the term "food product" refers to an edible, ingestible composition, including "solid food products" and "fluid food products."

As used herein, the term "fluid food product" refers to an edible, ingestible composition that has the ability to flow under the force of gravity at a temperature that is typical for the storage of that food product. Examples of fluid food products include, but are not limited to, puddings, gels, shortenings and spreads, dairy toppings, purees, peanut spreads, beverages, ketchups, sauces and gravies, and liquid egg products."

As used herein, the term "solid food product" refers to an edible, ingestible composition that does not readily flow under the force of gravity at a temperature that is typical for the storage of that product. Examples of solid food products include, but are not limited to, fruits, vegetables, meats (such as beef, pork, poultry, and fish), natural and processed cheeses, baked goods, snack foods, margarines, spreads, and gelled food compositions. The preservative compositions described in the present invention may also be utilized in products that are intended to be blended, mixed, injected, or otherwise incorporated into a finished solid food product, or applied to the surface of a solid food product. Examples include marinades, brine solutions, tenderizing solutions, dressings, sauces, gravies and the like that are intended to be added to solid food products, such as meats, poultry, fish, and vegetables.

As used herein, the term "substantially free of sorbate, benzoate and salts thereof" means that the preservative compositions comprise less than about 0.0005% by weight of sorbate, benzoate, and salts thereof (i.e. less than about 5 parts per million).

II. COMPOSITIONS OF THE PRESENT INVENTION

In one respect, the present invention relates to compositions comprising the following preservative system for use in or on a solid food product:

a. a moisture-sensitive isothiocyanate compound; and
b. a hygroscopic carrier;
wherein the composition is substantially free of sorbic acid, benzoic acid, and salts thereof.

It should be understood that the preservative system can be used in or on any food product, including solid food products and fluid food products, as previously defined. Therefore, as used herein, whenever the preservative system is used in or on solid food products, it should be understood that it can also be used in or on fluid food products.

a. The Isothiocyanate Compound

In accordance with the present invention, the products comprise a composition for preserving solid food products comprising a moisture-sensitive isothiocyanate compound (i.e., a compound bearing a —N=C=S moiety), such as, for example, the compound 4-hydroxybenzyl isothiocyanate, which is found in white mustard essential oil. While such compounds have been previously identified as having beneficial antimicrobial activity in food products, they are often used in combination with the known preservatives benzoic acid, sorbic acid or salts thereof. A possible reason for this is the inherent sensitivity to moisture-induced hydrolytic degradation that has not been fully recognized, hence the need for an additional preservative. However, by combining the moisture-sensitive isothiocyanate compound, such as the 4-hydroxybenzyl isothiocyanate in white mustard essential oil, with a hygroscopic carrier that attracts, absorbs, and binds moisture, Applicants have discovered that the moisture-sensitive isothiocyanate can be stabilized during storage. Consequently, the isothiocyanate is present and active upon use of the preservative composition for preserving food products. Importantly, the hygroscopic carrier also acts as a diluent that aids in the uniform distribution of the moisture-sensitive isothiocyanate throughout a solid food matrix, or over the surface of a solid food product. This diluent function of the hygroscopic carrier is particularly important because the moisture-sensitive isothiocyanate is an effective antimicrobial agent at relatively low usage levels and it can be difficult to evenly distribute such low levels within or on the surface of a solid food product without the use of a diluent.

Although any moisture-sensitive isothiocyanate can be used in the present compositions, the use of 4-hydroxybenzyl isothiocyanate is particularly preferred.

Regardless of the moisture-sensitive isothiocyanate employed, the present inventors have discovered that relatively low levels of the compound produce the desired antimicrobial effect in the present compositions and methods. In this regard, it is preferred that the isothiocyanate compound is present in the preservative composition in an amount of from about 0.0025% to about 10%, more preferably from about 0.005% to about 8%, still more preferably from about 0.01% to about 6%, and still more preferably from about 0.1% to about 4%, by total weight of the composition.

Any moisture-sensitive isothiocyanate compound bearing a —N=C=S moiety may be utilized in the present invention. Preferably, the isothiocyanate compound utilized in the present compositions has the structure:

wherein R is the 4-hydroxybenzyl or para-hydroxybenzyl moiety. This structure is commonly known as 4-hydroxybenzyl isothiocyanate or p-hydroxybenzyl isothiocyanate, and may be synthetically obtained or alternatively naturally obtained from, for example, white mustard.

In accordance with the present invention it is preferred that the constituent comprising the moisture-sensitive isothiocyanate compound is an essential oil, natural component of an essential oil, or synthetic component of an essential oil (all as described in more detail hereafter) of the white or yellow mustard family (*Sinapis alba* or *Brassica alba*). As is known, the Brassica family of plants is a small family having about 2000 species and over 300 genera (see e.g. Natural Food Antimicrobial Systems, edited by A. S. Naidu, CRC Press LLC, pp. 399-416, 2000). Alternatively, the constituent comprising the moisture-sensitive isothiocyanate compound may be an essential oil, natural component of an essential oil, or synthetic component of an essential oil of any other family of plants which may produce a moisture-sensitive isothiocyanate compound. See e.g., *Food Chemistry*, Edited by O. R. Fennema, Marcel Dekker, Inc., pp. 602-603 (1985) and *Naturally Occurring Antimicrobials in Food*, Council for Agricultural Science and Technology, pp. 31-32 (1998).

In accordance with the present invention, it is preferred to utilize an essential oil or, most preferably a natural component thereof, as a constituent of the present compositions, which may be readily utilized in food products. Wherein an essential oil, or natural component thereof, is utilized as a constituent of the present products, the oil is preferably derived from a plant which is a member of the Brassica family; a non-limiting preferred example being 4-hydroxybenzyl isothiocyanate. As used herein, "essential oil" refers to the set of all the compounds that can be distilled or extracted from the plant from which the oil is derived and that contributes to the characteristic aroma of that plant. See e.g., H. McGee, *On Food and Cooking*, Charles Scribner's Sons, p. 154-157 (1984). In accordance with the present invention, the essential oil preferably originates from a glucosinolate compound which is capable of producing an isothiocyanate compound (for example, through the catalytic hydrolysis of one or more glucosinolates by the enzyme myrosinase) wherein the precursor and enzyme containing plant tissue is homogenized, ground, crushed, pressed, or otherwise damaged. The essential oil derived from a Brassica family plant is obtained using procedures that are commonly known in the art.

As is known in the art, the seeds and/or flowers (preferably seeds) of any of, for example, a *Brassica* species, may be, homogenized, ground, crushed, pressed, or otherwise damaged to activate one or more precursors (e.g., glucosinolates) of the corresponding essential oil. Isothiocyanate compound production from the oil is known to occur by enzyme catalysis upon, for example, homogenizing, grinding, crushing, pressing, or otherwise damaging the plant, seed and/or flower thereof. See e.g., Concannon, WO 94/01121, published Jan. 20, 1994 and Brown et al., "Glucosinolate-Containing Plant Tissues as Bioherbicides", *Journal of Agricultural Food Chemistry*, Vol. 43, pp. 3070-3074 (1995). The enzyme commonly known to participate in the production of the isothiocyanate compound upon interaction with a glucosinolate is myrosinase, which is also known as thioglucoside glucohydrolase (and having enzyme classification number EC 3.2.3.1). Myrosinase is known to be non-specific for various glucosinolates.

The essential oil may be obtained by any of a variety of known methods. For example, the plant utilized may be homogenized, ground, crushed, pressed, or otherwise damaged (e.g., cut); the essential oil may then be extracted using an organic solvent, for example, an alcohol (e.g., ethanol) or diethyl ether or ethyl acetate, or a compound such as propylene glycol. See e.g., Ono et al., "6-Methylsulfinylhexyl Isothiocyanate and Its Homologues as Food-originated Compounds with Antibacterial Activity against *Escherichia coli* and *Staphylococcus aureus*", Bioscience, Biotechnology, and Biochemistry, Vol. 62 (2), pp. 363-365 (1998). Alternatively, the essential oil may be obtained via distillation (for example, steam distillation depending upon the volatility of the isothiocyanate compound present therein) after homogenizing, grinding, crushing, pressing, or otherwise damaging the plant, seed, flower, and/or any other component thereof. See e.g., Isshiki et al., "Preliminary Examination of Allyl Isothiocyanate Vapor for Food Preservation", Bioscience, Biotechnology, and Biochemistry, Vol. 56 (9), pp. 1476-1477 (1992).

Alternatively, the essential oil may be extracted using a supercritical fluid such as carbon dioxide, after homogenizing, grinding, crushing, pressing, or otherwise damaging the plant, seed, flower, and/or any other component thereof. Such processes are described in U.S. Pat. Nos. 5,017,397 and 5,120,558. Upon extraction of the essential oil, the extracts are preferentially stabilized by removing residual water from the extract by centrifugation, decanting, passage through a molecular sieve, exposure to an anhydrous salt, or drying under vacuum.

The essential oil itself, which contains one or more moisture-sensitive isothiocyanate compounds, preferably 4-hydroxybenzyl isothiocyanate, may then be utilized in the compositions and methods of the present invention.

Alternatively, a natural component of the essential oil may be utilized, wherein the essential oil is preferably derived from a Brassica family plant. As stated herein above, the natural component of the essential oil should comprise one or more moisture-sensitive isothiocyanate compounds (i.e., a compound bearing a —N=C=S moiety), preferably 4-hydroxybenzyl isothiocyanate.

The method by which the natural component is obtained from the essential oil is not critical to the present invention. According to the present invention, the natural component should comprise a moisture-sensitive isothiocyanate compound and may optionally comprise further components derived from the essential oil. To illustrate, the natural component of the essential oil may be obtained through standard purification of the essential oil itself to obtain one or more isothiocyanate compounds using, for example, extraction, chromatography, or distillation. For example, common chromatography techniques (e.g., HPLC) may be utilized to obtain a natural component of the essential oil. See e.g., Ono et al., "6-Methylsulfinylhexyl Isothiocyanate and Its Homologues as Food-originated Compounds with Antibacterial Activity against *Escherichia coli* and *Staphylococcus aureus*", *Bioscience, Biotechnology, and Biochemistry*, Vol. 62 (2), pp. 363-365 (1998). As a further example, an essential oil once distilled or extracted (the essential oil itself) may again be distilled or extracted to remove volatile components not of interest or to remove the isothiocyanate compound of interest. It is a preferred embodiment of the present invention to utilize a natural component of the essential oil.

Alternative to utilizing the essential oil or natural component thereof in the present invention, a synthetic component of an essential oil, preferably a *Brassica* essential oil, may be utilized. As used herein, the term "synthetic component" with reference to the corresponding essential oil refers to a component utilized in the present invention that naturally occurs in an essential oil which has been activated through myrosinase, but which is obtained through synthetic techniques without extraction or purification from a naturally occurring essential oil. As stated herein above, the synthetic component of the essential oil should comprise one or more moisture-sensitive isothiocyanate compounds (i.e., a compound bearing a —N=C=S moiety), preferably 4-hydroxybenzyl isothiocyanate.

A variety of synthetic isothiocyanate compounds may be commercially obtained, for example, from Aldrich Chemical Co., Milwaukee, Wis.; Fluka Chemical Co., Milwaukee, Wis.; Sigma Chemical Co., St. Louis, Mo.; and Lancaster Synthesis Inc., Windham, N.H. Additionally, synthetic methods of preparing isothiocyanate compounds are well-known in the art. See e.g., J. March, *Advanced Organic Chemistry*, John Wiley & Sons (1992). Additionally, natural production of isothiocyanate compounds may be synthetically mimicked by commercially obtaining one or more glucosinolate compounds and introducing myrosinase which may be isolated from any myrosinase producing plant (as discussed above) or commercially obtained (for example, myrosinase is commercially available as thioglucosidase from Sigma Chemical Co., St. Louis, Mo.). Alternatively, natural production of isothiocyanate compounds may be synthetically mimicked by isolating a glucosinolate compound from any glucosinolate producing plant and introducing myrosinase that is commercially obtained.

b. The Hygroscopic Carrier

As aforementioned, the isothiocyanate compositions utilized in the present invention are moisture-sensitive, meaning that they degrade (i.e. hydrolyze) upon exposure to water. This characteristic is one of the reasons that preservative formulations including these compounds have proven difficult to produce and utilize in the food preservation field. Another factor adding to the difficulty of formulation is the fact that white mustard essential oil is viscous and, therefore, may be difficult to disperse evenly within solid food matrices or on solid food surfaces. Furthermore, isothiocyanate compounds in general, and 4-hydroxybenzyl isothiocyanate in particular, are effective antimicrobial agents at relatively low usage levels. Therefore, it can be difficult to evenly distribute such low levels of the isothiocyanate within or on the surface of a solid food product. For the isothiocyanate to act as an effective antimicrobial, it is preferable that the preservative be evenly dispersed within the food (e.g. ground beef) or over the surface of the food item (e.g. intact cuts of meat, poultry, or fish).

The present inventors have surprisingly discovered that both of the aforementioned issues, i.e. moisture-sensitivity and uniform distribution within or on a solid food product, may be addressed by dilution of the isothiocyanate in a hygroscopic carrier. However, it should be understood that not all embodiments herein require the use of a carrier. There are numerous methods by which to dilute the moisture-sensitive isothiocyanate. For example, the isothiocyanate or the essential oil comprising the isothiocyanate may be dissolved, dispersed, or otherwise uniformly blended in a liquid hygroscopic carrier. Alternatively, the isothiocyanate or the essential oil comprising the isothiocyanate may be triturated with, plated onto, or otherwise intimately mixed with the solid particles of a powdered or granular hygroscopic carrier. Trituration is a preferred process, in which the isothiocyanate or the essential oil comprising the isothiocyanate and the hygroscopic powder or granular material are intimately mixed by pulverizing and/or comminuting thoroughly by rubbing or grinding. Plating of the isothiocyanate or the essential oil comprising the isothiocyanate onto the solid particles of a powdered or granular hygroscopic carrier refers to the process of coating the surface of such particles with a film or coating of the isothiocyanate or essential oil.

Any number of hygroscopic materials may be used in the present invention. Suitable liquid hygroscopic materials for use as carriers include, but are not limited to, glycerin, polyethylene glycol, and propylene glycol. Suitable powdered or granular solid hygroscopic materials for use as carriers include, but are not limited to, polysaccharides (including maltodextrins, starches, and microcrystalline cellulose), oligosaccharides, sugars (including glucose, fructose, sucrose, maltose, and lactose), sugar alcohols (including mannitol, maltitol, erythritol, and sorbitol), salt, silicon dioxide (including precipitated and fumed silicas), and anti-caking agents and/or flow agents (including sodium silicoaluminate, calcium silicate, magnesium silicate, tricalcium phosphate, and magnesium carbonate). Particularly preferred carriers are maltodextrin and glycerin. The type of hygroscopic carrier used will depend on the ultimate application for the preservative composition. For instance, for many uses the preferred carrier will be one of the powdered or granular solid materials, in particular maltodextrin, because of the ease of handling and shipping of the preservative composition. However, there may be certain instances in which a liquid preservative composition may be preferred because of its capability to be pumped or injected and/or because of its flow properties that may be critical for effective coating of the surfaces of solid food products. For example, use of glycerin as the hygroscopic carrier may be particularly effective when the preservative composition is blended into a ground beef product, in which the capability of the preservative composition to flow and uniformly coat the individual ground beef pieces may be beneficial.

The preservative compositions will typically comprise from about 90% to about 99.9%, by weight, of the hygroscopic carrier. Typically, the compositions will comprise from about 92% to about 99.9%, more typically from about 94% to about 99.9%, and even more typically from about 96% to about 99.9% by weight, of the hygroscopic carrier.

III. FOOD PRODUCTS COMPRISING THE PRESERVATIVE COMPOSITIONS OF THE PRESENT INVENTION

In another aspect, the present invention is directed to solid food products that are treated with the preservative compositions described herein. In this regard, the moisture-sensitive isothiocyanate compound, preferably 4-hydroxybenzyl isothiocyanate, will typically be present in an amount of from about 0.001% to about 0.06%, by weight, of the solid food product. More typically, the moisture sensitive isothiocyanate compound will be present in an amount of from about 0.003% to about 0.05%, even more typically from about 0.005% to about 0.04%, by weight, of the solid food product.

There are a variety of methods by which to add the isothiocyanate preservative composition to the solid food product, including, but not limited to, blending or otherwise mixing into a solid food matrix (e.g. ground beef) or preparing a liquid solution or dispersion comprising the isothiocyanate preservative composition (e.g. wash solution, brine solution, tenderizing solution, or marinade) into which a solid food product (such as a fruit, vegetable, or cut of meat, poultry, or fish) is dipped or immersed to apply the preservative to the surface. Alternatively, a liquid solution or dispersion comprising the isothiocyanate preservative composition (e.g. brine solution, tenderizing solution, or marinade) may be sprayed, brushed, or otherwise coated onto the surface of the solid food product (such as, for example, a beef or poultry carcass), or it may be incorporated into the interior of the solid food product by pressure injection or vacuum tumbling. Pressure injection and vacuum tumbling are especially preferred methods for incorporating the isothiocyanate preservative composition into intact cuts of meat, such as beef, pork, poultry, and fish. The isothiocyanate preservative compositions may also be incorporated into the materials used in the packaging of solid food products, which because of the intimate contact between the package material and the solid food product, allows for the transfer of the preservative composition to the surface of the food product. A non-limiting example of such packaging material includes the absorbent pads placed under cuts of meat, such as poultry, that are intended for retail distribution.

IV. METHOD OF THE PRESENT INVENTION

The present invention further relates to a method for preserving a solid food product, the method comprising:
a) providing a solid food product;
b) adding to the solid food product a preservative composition comprising a moisture-sensitive isothiocyanate compound; and
c) within about 2 hours of adding the preservative composition to the solid food product, maintaining the temperature of the solid food product at a temperature not more than about 10° C. for at least about 12 hours.

In accordance with the present invention, the foregoing method relates to the preservation of food products, and preferably solid food products. Non-limiting examples of solid food products include, but are not limited to, fruits, vegetables, meats (such as beef, pork, poultry, and fish), natural and processed cheeses, baked goods, snack foods, margarines, spreads, and gelled food compositions. The preservative compositions described in the present invention may also be utilized in fluid products that are intended to be blended, mixed, injected, or otherwise incorporated into a finished solid food product, or applied to the surface of a solid food product. Examples include marinades, brine solutions, tenderizing solutions, dressings, sauces, gravies and the like that are intended to be added to solid food products, such as meats, poultry, fish, and vegetables.

Moreover, the present inventors have surprisingly discovered that the residence time of the moisture-sensitive isothiocyanate compound, preferably 4-hydroxybenzyl isothiocyanate may be extended by first adding the isothiocyanate preservative composition to the solid food product by any means discussed above, and then maintaining the temperature of the food product at not more than about 10° C., preferably not more than about 7.5° C., and more preferably not more than about 5° C. As a result of storing the solid food product at reduced temperature, the rate of degradation (i.e. hydrolysis) of the moisture-sensitive isothiocyanate is reduced. Consequently, the residence time or life time of the active isothiocyanate antimicrobial compound is prolonged and the resultant antimicrobial efficacy is enhanced.

If the aforementioned liquid solution or dispersion comprising the isothiocyanate preservative composition is utilized to add the preservative to a solid food product (e.g. wash solution, brine solution, tenderizing solution, or marinade), it is preferable that the solution or dispersion is maintained at a low temperature in order to minimize degradation of the moisture-sensitive isothiocyanate. Preferably, the solution or dispersion is maintained at a temperature lower than about 10° C., more preferably lower than about 7.5° C., and most preferably lower than about 5° C. Furthermore, the liquid solution or dispersion comprising the isothiocyanate preservative composition preferably has a pH between about pH 2 to 5, more preferably between pH 3 to 4.5, in order to minimize the rate of degradation of the moisture-sensitive isothiocyanate. The liquid solution or dispersion may optionally contain an added surface active agent or emulsifier to improve spreadability and achieve a uniform coverage of the solution or dispersion onto a solid food product surface.

The solid food product need not necessarily be exposed to low temperatures immediately after adding the isothiocyanate preservative composition, however, it is preferred that no more than about 2 hours, more preferably no more than about 1 hour, and even more preferably no more than about 30 minutes, is permitted to elapse before exposing the food product to the low temperature. It is generally most preferable that the solid food product be immediately exposed to low temperature after addition of the isothiocyanate preservative composition. Once exposed, the temperature of the food product should be maintained at this low level for at least about 12 hours, preferably at least about 24 hours, more preferably at least about 72 hours, and even more preferably at least about 120 hours, in order to prolong the residence time of the moisture-sensitive isothiocyanate compound in or on the food product.

V. TEST METHOD FOR MEASUREMENT OF 4-HYDROXYBENZYL ISOTHIOCYANATE AND IDENTIFICATION OF MOISTURE-SENSITIVE ISOTHIOCYANATE COMPOUNDS

Supercritical fluid chromatography can be used to determine the amount of 4-hydroxybenzyl isothiocyanate in a preservative composition. First an accurately weighed amount of the preservative composition is either dissolved in a compatible solvent such as ethyl acetate or ethyl acetate and ethanol mixtures or solid preservative compositions are extracted repeatedly with ethyl acetate.

These solutions are analyzed by supercritical fluid chromatography using the method described by Buskov, S. et al., "Supercritical fluid chromatography as a method of analysis for the determination of 4-hydroxybenzylglucosinolate degradation products," *Journal of Biochemical and Biophysical Methods*, Vol. 43, pp 157-174 (2000) with the following modifications. A Berger SFC 3D system equipped with a photodiode array detector (Berger Instruments Inc., Newark, Del.) is used for the analysis. An ethyl acetate solution (10 µl) containing butyl paraben as the internal standard is injected onto a Cyano column (15 cm×5 mm i.d., 5 µm particle size, Phenomenex, Torrance, Calif.). The oven temperature is 50° C. The mobile phase is $CO_2$ with 4% MeOH as a modifier maintained at a pressure of 200 Bar and pumped at 2 mL/min. The eluate is detected at 226 and 252 nm. The 4-hydroxybenzyl-isothiocyanate elutes after about 3.8 min. Its identity is confirmed by chromatographing a pure sample of synthetic 4-hydroxybenzyl isothiocyanate prepared in the following manner.

The method described by Soledade, M., Pedras, C. and Smith, K. C. entitled "Sinalexin, phytoalexin from whole mustard elicited by destrucin B and *Alternaria brassicane*" in

*Phytochemistry*, 46 (5), p. 833-837, 1997 was modified and is used as follows. In a 100 mL round bottom flask, thiophosgen (1.1 g, 9.56 mmol) is dissolved in chloroform (20 mL). Subsequently, a solution of p-hydroxybenzylamine (400 mg, 3.25 mmol) and triethyl amine (820 mg, 8.1 mmol) dissolved in methanol (20 mL) is added dropwise to the stirred solution kept at 0-4° C. using an ice bath. After approximately 30 min, addition is finished and the mixture allowed to remain in the ice bath for an additional 10 minutes. The reaction is followed by Thin Layer Chromatography on silica gel $60_{254}$ using the FCC eluent as the mobile phase. Subsequently, the solvent is removed in vacuo by rotary evaporation at 45° C. and the residue is dissolved in a mixture of dichloromethane-ethyl acetate (49+1; 4 mL). The compound is further purified by flash column chromatography as described by Still, W. C., Kahn, M. and Mitra A. J. in "Rapid chromatographic method for separation with moderate resolution," Organic Chemistry, 14, pp. 2923-2925. 1978, with modifications. After flushing the column with mobile phase, the reaction product dissolved in mobile phase (4 mL) is placed on top of the column. Elution is performed by adjusting the argon overpressure in a way so that the solvent head drops about 2 inch/min Aliquots of 10 mL are collected. The target compound usually elutes in fractions 6-10. The fractions are combined and after removing the solvent by rotary evaporation at 45° C. in vacuo, a yellow oil is obtained (typical yield: 66%). The structure of 4-hydroxybenzyl isothiocyanate is confirmed by $H^1$-NMR in $CDCl_3$, $C^{13}$-NMR in $CDCl_3$ and GC-MS operating in electron impact mode.

Moisture-sensitive isothiocyanate compounds are identified by suspending the isothiocyanate containing material in an aqueous phosphate buffer (pH of about 3.6) at room temperature. The resulting suspension is shaken well, and a time zero sample is withdrawn into a separatory funnel and extracted with ethyl acetate. This extraction is repeated with two further volumes of ethyl acetate. The separated ethyl acetate layers are pooled and dried over anhydrous sodium sulfate and kept frozen before analysis of the time zero isothiocyanate concentration by supercritical fluid chromatography. To determine sensitivity of the isothiocyanate compound to hydrolytic degradation, the isothiocyanate suspension is stored at a temperature between about 20° C. to about 23° C. for a period of about 24 hours. The extraction procedure is repeated after 24 hours and the level of residual isothiocyanate compound is measured by supercritical fluid chromatography. Moisture-sensitive isothiocyanate compounds are characterized by at least about a 20% reduction in concentration of the isothiocyanate after about 24 hours, relative to the time zero or starting concentration.

VI. EXAMPLES

Example 1

A white mustard essential oil is generated by adding water to ground white mustard seeds and then extracting the essential oil with supercritical carbon dioxide according to the known processes described in the art. Immediately after extraction, residual moisture is removed from the essential oil by centrifugation and by drying under vacuum. The resulting white mustard essential oil contains about 25% by weight 4-hydroxybenzyl isothiocyanate. The essential oil is suspended in an aqueous phosphate buffer (pH of about 3.6) at room temperature (about 20-23° C.) and the level of 4-hydroxybenzyl isothiocyanate measured at time zero and after about 24 hours of storage as described in the preceding section. The percent reduction in level of 4-hydroxybenzyl isothiocyanate after 24 hours is about 72%. Therefore, 4-hydroxybenzyl isothiocyanate is a moisture-sensitive isothiocyanate compound.

Example 2

A liquid preservative composition is prepared by blending the white mustard essential oil of Example 1 with glycerin according to the following formulation.

|  | Wt % | Weight |
|---|---|---|
| White mustard essential oil (from Example 1) | 2.0% | 2.0 g |
| Glycerin | 98.0% | 98.0 g |
| TOTAL | 100% | 100 g |

The resulting blend is thoroughly mixed to uniformly disperse or dissolve the essential oil in the glycerin carrier. The level of 4-hydroxybenzyl isothiocyanate in the preservative composition is about 0.5% by weight.

Example 3

A powdered preservative composition is prepared by triturating the white mustard essential oil of Example 1 with maltodextrin according to the following formulation.

|  | Wt % | Weight |
|---|---|---|
| White mustard essential oil (from Example 1) | 10.0% | 10.0 g |
| Maltodextrin (15 DE) | 90.0% | 90.0 g |
| TOTAL | 100% | 100 g |

The blend of materials is intimately mixed or triturated using a mortar and pestle. The level of 4-hydroxybenzyl isothiocyanate in the resulting preservative composition is about 2.5% by weight. The level of 4-hydroxybenzyl isothiocyanate in the powdered preservative composition remains stable during storage of the preservative composition at room temperature (about 21.1° C.).

Example 4

The liquid preservative composition of Example 2 is used to preserve ground beef during storage. The liquid preservative composition is added to ground beef at a level of about 2% by weight and the resulting blend thoroughly mixed to uniformly distribute the preservative composition within the product. The level of 4-hydroxybenzyl isothiocyanate in the resulting ground beef product is about 0.01% by weight. The ground beef is packaged and stored at about 4° C.

Example 5

The powdered preservative composition of Example 3 is added to a chilled wash water for poultry. The preservative composition is dispersed into the wash water with agitation. The temperature of the wash water is about 4° C. and the level of addition of the preservative composition is about 1.8% by weight. The level of 4-hydroxybenzyl isothiocyanate in the wash water is about 0.045% by weight. The preservative composition is applied to the surface of poultry pieces by dipping or immersing the individual pieces into the chilled wash water containing the preservative composition. The resulting poultry pieces are then packaged and stored at about 4° C.

Example 6

The powdered preservative composition of Example 3 is added to a chilled brine solution at a level of about 3.0% by weight. The resulting brine solution is thoroughly blended to uniformly disperse the preservative composition. The level of 4-hydroxybenzyl isothiocyanate in the brine solution is about 0.075% by weight. The brine solution is held at about 4° C. and injected under pressure into the interior of intact cuts of meat. The level of addition of the brine solution to the meat is about 7% by weight. The level of 4-hydroxybenzyl isothiocyanate in the finished meat product is about 0.0053% by weight.

Example 7

The white mustard essential oil of Example 1 is dispersed into a chilled liquid marinade solution for application to meat products. The marinade solution is held at about 4° C. and the essential oil is dispersed using vigorous agitation. The level of white mustard essential oil in the marinade solution is about 1% by weight. The level of 4-hydroxybenzyl isothiocyanate in the marinade solution is about 0.25% by weight. Intact cuts of meat (beef, poultry, pork, or fish) held at about 4° C. are fully immersed into the marinade solution containing the white mustard essential oil. The rate of application of the marinade solution to the meat is about 4% by weight. The level of 4-hydroxybenzyl isothiocyanate in the marinated meat products is about 0.01% by weight. The resulting marinated meat products are packaged and stored at about 4° C.

Example 8

This example demonstrates the effect of 4-hydroxybenzyl isothiocyanate for control of spoilage in a ketchup formula at ambient temperature.

Ketchup is an acid food with a pH of 3.5-3.8 that can be cold filled at 100±20° F. in PET bottles. The product is vulnerable during filling operation at the filler, susceptible for recontamination by adventitious spoilage microorganisms such as lactic acid bacteria (LAB) and acid and preservative tolerant yeasts (APRY).

All natural tomato ketchup products were made, a first sample with sodium (ANK) and a second sample with reduced sodium (ANK-RS). Each sample was split, and to each about 150 ppm and 300 ppm 4-hydroxybenzyl isothiocyanate was added. The samples were further split (for a total of eight samples) and inoculated as follows. Microorganisms were inoculated into four samples with a cocktail consisting of four separate lactic acid spoilage bacteria (250 CFU/gm) such as *Lactobacillus fructivorans, L. fermentum, L. plantar* and *L. hilgardii*. The four remaining samples were inoculated with *Zygosaccharomyces bailii*—(150-200 CFU/gm) previously isolated from a ketchup spoilage incident.

A summary of the samples is as follows:
1: ANK—150 ppm 4HBITC—inoculated with four lactic acid bacteria
2: ANK—150 ppm 4HBITC—inoculated with *Z. bailii*
3: ANK—300 ppm 4HBITC—inoculated with four lactic acid bacteria
4: ANK—300 ppm 4HBITC—inoculated with *Z. bailii*
5: ANK-RS—150 ppm 4HBITC—inoculated with four lactic acid bacteria
6: ANK-RS—150 ppm 4HBITC—inoculated with *Z. bailii*
7: ANK-RS—300 ppm 4HBITC—inoculated with four lactic acid bacteria
8: ANK-RS—300 ppm 4HBITC—inoculated with *Z. bailii*

The inoculated ketchup samples were stored at 22° C. (75° F.) and enumerated at 48, 72, 96, and 168 hours of incubation. The lactic acid bacteria and yeasts counts were performed as described in FDA BAM manual. The plate counts were then used to identify the degree of microbial kill or stasis in the inoculated product. Lactic acid bacteria counts were reduced to non-detectable level by 96 and 168 hours for ANK and ANK-RS, respectively, at 300 ppm 4-hydroxybenzyl isothiocyanate. At 150 ppm, the declining trend was gradual taking 336 hours to non-detectable level for both ANK and ANK-RS. Un-inoculated controls grew to level of 1000-1500 CFU/gm. In the *Z. bailii* inoculated samples, counts were reduced to non-detectable level at 96 hours, both with and without 4-hydroxybenzyl isothiocyanate. However, there was no regrowth in the samples with 4-hydroxybenzyl isothiocyanate up to 336 hours (150 and 300 ppm). Regrowth was noticed around 96-108 hours ending at $1\times10^6$ CFU/gm in control samples without 4-hydroxybenzyl isothiocyanate.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A food product comprising a preservative composition, the preservative composition comprising:
 a. 4-hydroxybenzyl isothiocyanate;
 b. a hygroscopic carrier;
wherein the preservative composition is substantially free of sorbic acid, benzoic acid, and salts thereof.

2. The food product of claim 1 and wherein the food product comprises a solid food product.

3. The food product of claim 1 and wherein the food product comprises a fluid food product.

4. The food product of claim 2 and wherein the solid food product comprises a gelled food composition.

5. The food product of claim 1 and wherein the 4-hydroxybenzyl isothiocyanate is present in the preservative composition in an amount of from about 0.0025% to about 10% by weight.

6. The food product of claim 1 and wherein the 4-hydroxybenzyl isothiocyanate is present in the preservative composition in an amount of from about 0.005% to about 8% by weight.

7. The food product of claim 1 and wherein 4-hydroxybenzyl isothiocyanate is present in the preservative composition in an amount of from about 0.01% to about 6% by weight.

8. The food product of claim 1 and wherein the 4-hydroxybenzyl isothiocyanate is present in the preservative composition in an amount of from about 0.1% to about 4% by weight.

9. The food product of claim 1 and wherein the 4-hydroxybenzyl isothiocyanate is present in an amount of from about 0.001% to about 0.06% by weight of the food product.

10. The food product of claim 1 and wherein the hygroscopic carrier comprises maltodextrin.

* * * * *